United States Patent
Isobe et al.

[11] Patent Number: 5,992,156
[45] Date of Patent: Nov. 30, 1999

[54] AIR CONDITIONING SYSTEM FOR VEHICLES

[75] Inventors: Toshimi Isobe, Isesaki; Keiichi Funakoshi, Saitama, both of Japan

[73] Assignee: Sanden Corporation, Gunma, Japan

[21] Appl. No.: 09/184,353

[22] Filed: Nov. 2, 1998

[30] Foreign Application Priority Data

Nov. 4, 1997 [JP] Japan .................................. 9-319032

[51] Int. Cl.$^6$ .................................................. F25D 17/04
[52] U.S. Cl. ................................ 62/18; 62/178; 62/244; 236/91 F
[58] Field of Search ........................... 62/178, 180, 186, 62/244; 236/91 F, 91 C

[56] References Cited

U.S. PATENT DOCUMENTS

| | | | |
|---|---|---|---|
| 2,774,227 | 12/1956 | Schjolin et al. | 62/117 |
| 3,926,000 | 12/1975 | Scofield | 62/244 X |
| 4,344,356 | 8/1982 | Casterton et al. | 98/2.11 |
| 4,365,541 | 12/1982 | Marques et al. | 98/2.11 |
| 4,401,013 | 8/1983 | Ohashi et al. | 98/2.11 |
| 4,612,975 | 9/1986 | Ikari | 165/43 |
| 4,796,738 | 1/1989 | Sato | 62/133 |
| 4,874,036 | 10/1989 | Masuda | 165/42 |
| 5,137,213 | 8/1992 | Yamamoto et al. | 165/39 X |
| 5,205,484 | 4/1993 | Susa et al. | 236/35.3 |
| 5,749,236 | 5/1998 | Tavian et al. | 62/186 |

*Primary Examiner*—Henry Bennett
*Assistant Examiner*—Marc Norman
*Attorney, Agent, or Firm*—Baker & Botts, L.L.P.

[57] ABSTRACT

An air conditioning system for vehicles has a cooling circuit and a radiator supplying cooling water to an engine. The cooling circuit includes a compressor, a condenser and an evaporator. The system includes a water temperature sensor for detecting a water temperature in the radiator, and a control device for selectively controlling the opening of ports to allow temperature controlled air to flow into an interior of a vehicle, in accordance with the water temperature, detected by the water temperature sensor, and a target conditioned air temperature. In the system, the power to an air conditioner may be appropriately restricted, and the amount of heat radiation at the condenser may also be appropriately restricted. Consequently, the water temperature in the radiator may be prevented from becoming too hot, thereby preventing instances of overheating and preventing a warning of a potential overheat.

18 Claims, 2 Drawing Sheets

FIG. 2

AIR CONDITIONING SYSTEM FOR VEHICLES

BACKGROUND OF THE INVENTION

1. Field of the Invention

The present invention relates to an air conditioning system for vehicles, and, more specifically, to an air conditioning system suitable as an air conditioner for use in a work vehicle.

2. Description of the Related Art

In a vehicle having a radiator supplying water to an engine, the radiator is generally mounted in an engine compartment together with other equipments for an air conditioner. A compressor provided in a cooling circuit of the air conditioner is generally driven by using the power of an engine. If the consumptive power of the engine is too much, the engine may heat up and the water temperature in the radiator may be too hot, thereby causing the vehicle to overheat. If the vehicle overheats or a warning that the vehicle is about to overheat occurs, the operation of the vehicle is stopped or a restriction on the operation of the vehicle occurs.

In work vehicles, for example power shovels, common sized cabins are frequently used regardless of the size or weight of the vehicles. Thus, the specification and abilities of air conditioners required for such common cabins may be substantially the same. However, the engine and equipment around the engine, including the radiator, tend to become smaller as the size and weight of the vehicle decreases. Therefore, in smaller sized work vehicles:

a) The amount of power consumed to drive the compressor of the air conditioner and thus the total consumptive power of the engine is increased, and the engine tends to heat up.

b) The condenser covers a greater amount of area of the radiator so that the ability of the radiator to handle heat radiation decreases.

c) Because generally, the engine compartment is not too wide, the ability to exhaust heat is not good. Therefore, heat tends to be trapped in the engine compartment, and a) and b) may be exasperated.

As a result, in smaller vehicles the water temperature in the radiator tends to be high, and overheating often occurs.

Moreover, in a work vehicle, a door and/or a window may frequently be open. This causes the cooling load to increase, which causes the heat radiated from the condenser to increase, which results in a decrease in the ability of the radiator to handle the heat radiation. As a result, the water temperature in the radiator may increase and the vehicle may overheat.

SUMMARY OF THE INVENTION

Accordingly, it is an object of the present invention to provide an air conditioning system for vehicles, suitable for work vehicles, which may prevent vehicles from overheating and may reduce the likelihood of overheating by controlling the air conditioner, thereby maintaining operation of the air conditioner and prevent unwanted stalling of the vehicle or restricting its operation.

It is another object of the present invention to provide an air conditioning system for vehicles which may reduce the consumptive power of the air conditioner to adjust the water temperature in the radiator to within a desired range, even when the water temperature in the radiator increases above the desired range.

It is a further object of the present invention to provide an air conditioning system for vehicles which may achieve comfortable cooling conditions within a desired range, even when the water temperature in the radiator increases above the desired range.

To achieve the foregoing and other objects, an air conditioning system for vehicles according to the present invention is provided. The air conditioning system for vehicles according to the present invention has a cooling circuit and a radiator that supplies cooling water to an engine. The cooling circuit includes a compressor for compressing refrigerant, a condenser for condensing refrigerant, and an evaporator disposed within an air duct for evaporating refrigerant. The air conditioning system comprises a water temperature sensor that detects the temperature of the water in the radiator, and a control device that selectively controls the opening of ports that allow temperature controlled air into an interior of a vehicle in response to the water temperature, detected by the water temperature sensor, and a target conditioned air temperature.

In the air conditioning system, the target conditioned air temperature is calculated in the control device. The target conditioned air temperature is the temperature of the air entering the interior of the vehicle from the air conditioner that brings the interior air temperature to a set temperature. For example, the target conditioned air temperature is calculated based on a difference between the air temperature in the interior and the set temperature; the outside air temperature; the amount of sunshine; predetermined basic values; and the like. The predetermined basic values may be provided as appropriate amendment values, function coefficients for calculation, etc., in accordance with the types of the air conditioner and the vehicle.

In the air conditioning system, the control device further may control the operation of the compressor in response to the water temperature, detected by the water temperature sensor, and the target conditioned air temperature. Further, the control device may also control the amount of air entering the interior of the vehicle through ports selectively opened by the control device in response to the water temperature and the target conditioned air temperature. The amount of entering air may be controlled, for example, by controlling the rotational speed of a blower provided in the air conditioner. The rotational speed of the blower may be controlled, for example, by adjusting the voltage applied to the blower.

Further, in the air conditioning system, the control device may restrict the opening of ports in accordance with the target conditioned air temperature, when the water temperature in the radiator reaches a first limit temperature (for example, 90° C.) at which a caution signal to prevent overheating is generated. In this embodiment, the control device may allow only a face mode port to open when the water temperature in the radiator reaches a second limit temperature (for example, 100° C.), to prevent overheating. The second limit temperature is higher than the first limit temperature. When the water temperature reaches the second limit temperature, the control device turns the compressor off.

Such an air conditioning system for vehicles may be suitable as an air conditioner in a cabin of a work vehicle.

In the system according to the present invention, the ports are opened selectively and restrictively in response to the water temperature in the radiator and the target conditioned air temperature, so that the engine load does not exceed a predetermined limit. Therefore, the power that the air conditioner uses may be proportionally reduced, and the amount of heat radiation generated by the condenser may also be proportionally reduced. As a result, the water temperature in the radiator may be prevented from exceeding a predetermined limit and instances of overheating or the potential for overheating may be reduced or eliminated.

Further, even if the water temperature in the radiator reaches the first limit temperature, the position of the ports to be opened may be operated in accordance with the target conditioned air temperature at that time. In addition to such control, the operation of the compressor or the amount of air entering the vehicle's interior from the air conditioner may be controlled. As a result, the load from the air conditioner may be properly decreased, thereby preventing instances of overheating.

Moreover, even if the water temperature in the radiator reaches the second limit temperature, the individual ports that are open may be limited to a specified port that requires only a small amount of directed air, or the operation of the compressor may be turned off. By such operation, the load from the air conditioner side may be significantly decreased or eliminated, and therefore, actual instances of overheating may be prevented.

Additionally, when the port to be opened is restricted to a specified port, desired air conditioning may be possible. Desired air conditioning creates an optimum air conditioning state for a driver. For example, when the air conditioner is on with a door or window open, by restricting the open ports to only face mode port, the load of the air conditioner may be significantly reduced, thereby preventing instances of overheating while maintaining a possible comfortable condition for continuing the operation of the vehicle.

Thus, in the present invention, an air conditioner suitable for use in a work vehicle is provided, and comfortable air conditioning may be realized without restricting the operation of the work vehicle.

Further objects, features, and advantages of the present invention will be understood from the following detailed description of the preferred embodiment of the present invention with reference to the accompanying figure.

BRIEF DESCRIPTION OF THE DRAWING

A preferred embodiment of the invention is now described with reference to the accompanying figures, which is given by way of example only, and is not intended to limit the present invention.

FIG. 2 is a schematic diagram of the air conditioning system according to the embodiment of the present invention.

DETAILED DESCRIPTION OF PREFERRED EMBODIMENTS

Figure 1:
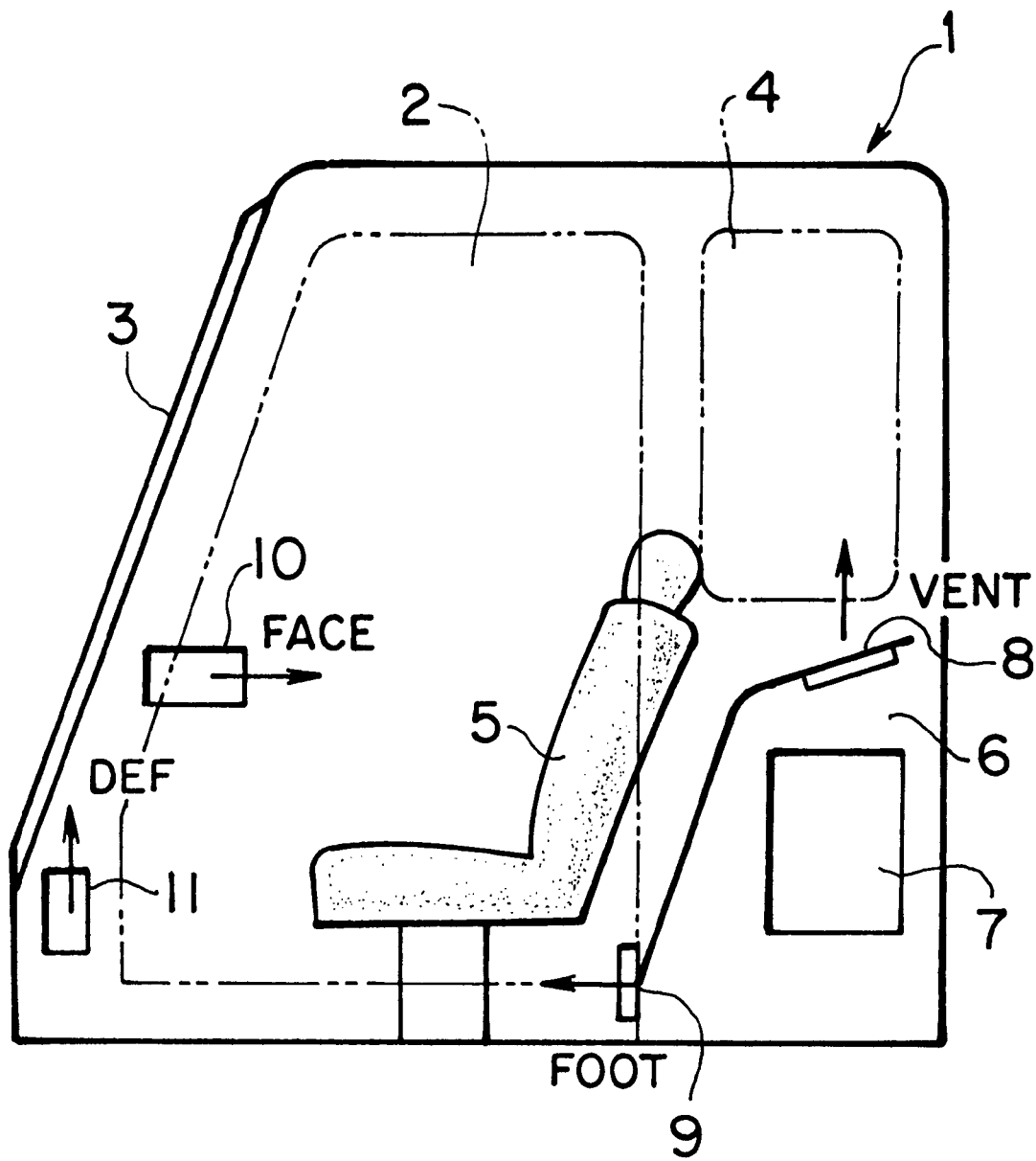
FIG. 1 is a vertical sectional view of a cabin of a work vehicle using an air conditioning system according to an embodiment of the present invention.
Figure 2:
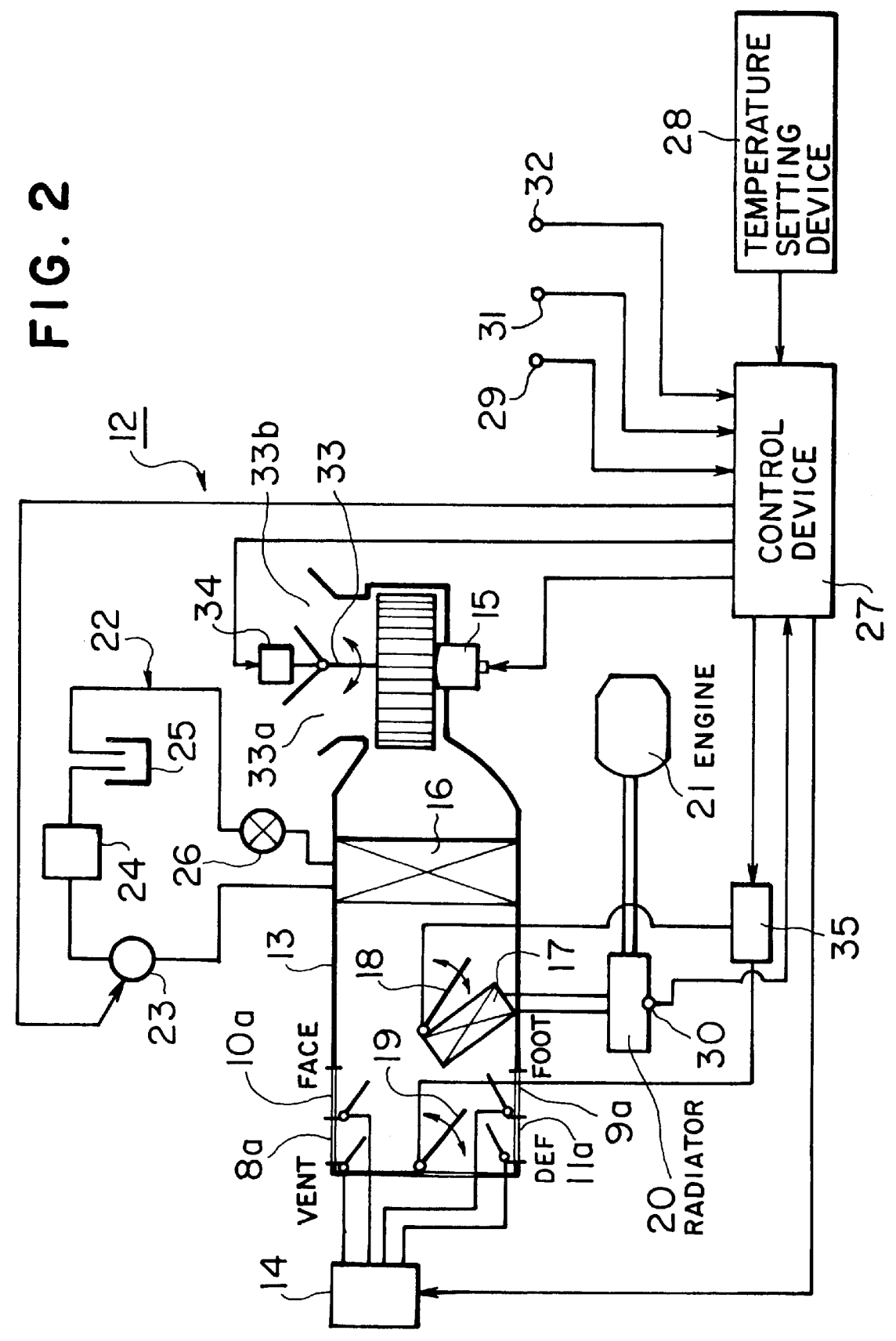

FIGS. 1 and 2 show an embodiment of an air conditioning system for vehicles according to the present invention. In this embodiment, the air conditioning system is applied to an air conditioner for a cabin of a work vehicle. Cabin 1 has a door 2, a front window 3, a rear side window 4, and a driver's seat 5. Main body 7 of the air conditioner is provided in a compartment 6 disposed at a rear position in the cabin 1. Compartment 6 also contains other parts such as the vehicle's electronic control unit and other electric parts. The conditioned air from main body 7 of the air conditioner is blown out into cabin 1 selectively through a plurality of ports opened toward the inside of cabin 1. In this embodiment, the ports comprise VENT mode port 8, FOOT mode port 9, FACE mode port 10, and DEF mode port 11 (defrost mode port). Under normal conditions the ports are automatically selected when in automatic mode, and the ports are manually selected by a driver when in manual mode.

FIG. 2 depicts air conditioner 12. At one end portion of air duct 13, VENT mode air port 8a, FOOT mode air port 9a, FACE mode air port 10a, and DEF mode air port 11a are provided. VENT mode air port 8a, FOOT mode air port 9a, FACE mode air port 10a, and DEF mode air port 11a communicate with VENT mode port 8, FOOT mode port 9, FACE mode port 10, and DEF mode port 11, respectively. In this embodiment, ports 8a, 9a, 10a, and 11a are opened and closed by a single port switching actuator 14. Port switching actuator 14 may open ports 8a, 9a, 10a, and 11a individually or in conbination.

A blower 15 is provided in another end portion of air duct 13. A switching damper 33 controls the ratio of interior air drawn through interior air port 33a to exterior air drawn through exterior air port 33b. The operation of switching damper 33 is controlled by switching damper actuator 34. Interior air, exterior air, or mixed air is directed by blower 15 into air duct 13. However, when the air conditioning system is controlled according to the present invention as described below, only interior air is drawn through interior air port 33a.

An evaporator 16 for refrigerant and a heater core 17 are disposed in air duct 13 upstream and downstream of duct 13 respectively. An air mixing damper 18 is provided at a position immediately upstream of heater core 17 for adjusting the ratio of air passing through heater core 17 to air bypassing heater core 17. Air mixing damper 18 is controlled by air mixing damper actuator 35. A cool max damper 19 for enabling a cool max mode is provided at a position downstream of heater core 17 and between VENT mode air port 8a, FACE mode air port 10a, and FOOT mode air port 9a, and DEF mode air port 11a. Water from radiator 20 is circulated into heater core 17. This radiator water also is used as cooling water for engine 21.

Refrigerant is circulated in cooling circuit 22. Cooling circuit 22 includes evaporator 16, compressor 23 for compressing refrigerant sent from evaporator 16, condenser 24 for condensing refrigerant sent from compressor 23, reservoir tank 25, and expansion valve 26.

A desired air temperature in cabin 1 is set in temperature setting device 28. A signal providing the desired air temperature is input to control device 27. The signals of: interior air temperature detected by interior air temperature sensor 29, exterior air temperature detected by exterior air temperature sensor 31, and the amount of sunshine detected by sunshine sensor 32, also are input to control device 27. Control device 27 transmits control signals to blower 15, switching damper actuator 34, compressor 23, air mixing damper actuator 35, and cool max damper 19.

A water temperature sensor 30 is provided on radiator 20 for detecting the temperature of radiator water. The signal identifying the water temperature in the radiator that is detected by water temperature sensor 30 is sent to control device 27. Port switching actuator 14 is operated based on a signal from control device 27.

In air conditioner 12, the operation according to the present invention is performed as follows. The following operation is shown as an example only, and the present invention is not limited thereto. In control device 27, the air ports to be opened are determined and operated according to the signals of the water temperature in the radiator, detected by water temperature sensor 30, and the target conditioned air temperature, calculated in the control device 27. In addition to this control, the amount of blown air, controlled by the amount of voltage to blower 15, and the on/off operation of compressor 23 are controlled, for example, as shown in Table 1. As stated above, the target conditioned air temperature is determined by calculations within control device 27, and for example, the target conditioned air temperature may be calculated based on: a temperature difference between the interior air temperature, detected by interior air temperature sensor 29, and the temperature set by temperature setting device 28; the exterior air temperature detected by exterior air temperature sensor 31; the amount of sunshine detected by sunshine sensor 32; predetermined basic control values and coefficients; and the like.

When the water temperature in the radiator detected by water temperature sensor 30 reaches a first limit temperature (in this embodiment, set at 90° C.), a warning signal is generated to prevent overheating. In accordance with the target conditioned air temperature at that time, the control is forcibly switched to preset conditions (see Table 1), overriding the usual automatic control.

If the air conditioning system is in automatic control mode when the water temperature in the radiator detected by water temperature sensor 30 reaches a first limit temperature and the air temperature is within target conditioned air temperature (TOC) ≦25° C. (cooling mode in this condition), the only port allowed open is FACE mode port 10 even though some ports, such as VENT mode port, may have been opened (control C1 in Table 1). The amount of air blown either may remain unchanged under automatic mode, or may be decreased. Further, the drive of compressor 23 may remain unchanged on or may be forcibly turned off. FACE mode port 10 has only a small reduction in maximum air flow due to pressure loss from a duct communicating between FACE mode port 10 and FACE mode air port 10a. Thus, by only allowing FACE mode port to be open the cooling load may be decreased and the load applied to engine 21 via compressor 23 may be decreased. The amount of heat radiation at condenser 24 may decrease. Consequently, increases in the instances of overheating the water temperature in the radiator may be controlled, and may be reduced or eliminated. Moreover, while the load is decreased, cold air is still blown out from FACE mode port at the desired temperature. Therefore, a desired cooling condition that is comfortable to a driver may be achieved.

When 25° C.≦TOC≦40° C., the operation of air conditioner 12 may be in a bilevel mode, namely, a mode in which relatively cold air flows into the upper side of the interior of cabin 1, and relatively warm air flows into the lower side of the interior of cabin 1 (control C1 in Table 1). The amount of air flown may remain unchanged under the automatic mode. The drive of compressor 23 either may remain on, or may be forcibly turned off. At this condition, because the cooling adjustment is not great with respect to the range of TOC, it is possible that in order to reduce the increase of the radiator water temperature operation may be switched to the bilevel mode.

When 40° C.≦TOC (heating mode in this condition), the only port opened is forcibly restricted to FOOT mode port (control C1 in Table 1). The amount of blown air flow remains unchanged under the automatic mode (amount at a usual FOOT mode). The drive of compressor 23 is forcibly turned off. In this condition, effective heating may be performed by only allowing FOOT mode port open. Moreover, the consumptive power from compressor 23 is negligible because compressor 23 has been turned off, and the increase of the water temperature in the radiator may be controlled.

When the water temperature in the radiator detected by water temperature sensor 30 reaches the second limit temperature for preventing instances of overheating (in this embodiment, 100° C.), operation of air conditioner 12 is performed as follows. However, actual occurrence of such an instance of overheating is limited to the case where the control mode is in cooling mode and the cooling load becomes too great, because the above-described operation occurs when the water temperature in the radiator reaches the first limit temperature (90° C.) When the water temperature in the radiator reaches the second limit temperature as shown in Table 1, only FACE mode port 10 is opened, and the operation of compressor 23 is stopped. FACE mode port 10 has only a small reduction of maximum air flow due to pressure loss from a duct communicating between FACE mode port 10 and FACE mode air port 10a. Thus, the control of air flow may remain unchanged under automatic mode. Under this operation, the cooling load may be decreased and the load applied to engine 21 via compressor 23 may be decreased. The amount of heat radiation at condenser 24 may be decreased, any increase of the water temperature in the radiator may be controlled, and instances of overheating may be prevented. Moreover, while the load is thus decreased, cold air flows from FACE mode port 10 at a desired temperature. Therefore, a desired cooling condition that is comfortable to a driver may be achieved. Further, in this condition, if the cool max mode is employed, an even more comfortable (i.e., closely adjusted) condition may be realized.

Operation of air conditioner 12 in a manual mode is basically the same as operation under automatic mode. In manual mode, the only potential overheating problem is caused by an excessive load being placed on the air conditioner. Thus, both when the radiator water temperature reaches the first limit temperature (90° C.) and when the radiator water temperature reaches the second limit temperature (100° C.), only FACE mode port 10 may be opened. Under this operation, the cooling load may be decreased, and the load applied to engine 21 may be decreased. The amount of heat radiation at condenser 24 may be decreased, any increase of the water temperature in the radiator may be controlled, and instance of overheating may be prevented.

The operation under each condition while in manual mode is shown in Table 1. When the water temperature in the radiator detected by water temperature sensor 30 is lower than 90° C., for example during usual air conditioning, operation of air conditioner 12 may be performed as shown in Table 2.

The water temperature in the radiator is lowered by the above-described operation when the radiator water temperature reaches the first limit temperature (90° C.) or the second limit temperature (100° C.). Operation is returned to normal air conditioning when the water temperature in the radiator cools, for example, to 75° C. and 90° C., respectively, as shown in Table 1.

TABLE 1

| Water temperature in the radiator (° C.) | | Automatic mode | | | | | Manual mode | | Return temperature (° C.) |
|---|---|---|---|---|---|---|---|---|---|
| | | Port | Air amount | Temperature | Inside or outside air | Compressor | Port | Air amount | |
| 90 | Control mode Possibility of manual mode | C1 impossible | automatic impossible | automatic possible | inside air impossible | C1 FOOT impossible | FACE impossible | fixed impossible | 75 |
| 100 | Control mode Possibility of manual mode | FACE impossible | automatic impossible | cool max impossible | inside air impossible | off impossible | FACE impossible | fixed impossible | 90 |

C1: described in the specification

TABLE 2

| Water temperature in the radiator (° C.) | | Automatic mode | | | | | Manual mode | |
|---|---|---|---|---|---|---|---|---|
| | | Port | Air amount | Temperature | Inside or outside air | Compressor | Port | Air amount |
| lower than 90 (usual control) | Control mode Possibility of manual mode | automatic possible | automatic possible | automatic possible | inside air possible | on . off on . off | automatic possible | variable variable |

When the water temperature signal of 90° C. is detected and operation at 90° C. shown in Table 1 begins, for example, a buzzer signal may sound, for example, twice, or a light may illuminate as a warning. Further, when the water temperature signal of 100° C. is detected, and operation at 100° C. shown in Table 1 begins, for example, the buzzer signal may sound continuously.

If the operation is repeated at a condition, for example, 100° C.→90° C.→100° C., the amount of blown air at 90° C. in the automatic mode may be reduced, thereby preventing such a repeat. For example, the voltage of blower 15 may be significantly reduced.

Although the first limit temperature is set to 90° C. and the second limit temperature is set to 100° C. in the above-described embodiment, these limit temperatures may be set to other values, for example, 80° C. and 90° C., respectively.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. An air conditioning system for vehicles having a cooling circuit and a radiator supplying cooling water to an engine, said cooling circuit including a compressor for compressing refrigerant, a condenser for condensing refrigerant, and an evaporator disposed in an air duct for evaporating refrigerant, said air conditioning system comprising:
    a water temperature sensor that detects a water temperature in said radiator; and
    a control device that selectively controls the opening of a port through which temperature controlled air flows into an interior of a vehicle in response to said water temperature that is detected by said water temperature sensor and a target conditioned air temperature, wherein said target conditioned air temperature is determined by said control device.

2. The air conditioning system according to claim 1, wherein said control device further controls the operation of said compressor in response to said water temperature and said target conditioned air temperature.

3. The air conditioning system according to claim 1, wherein said control device further controls an amount of air flowing into said interior of said vehicle through said port selectively opened by said control device in response to said water temperature and said target conditioned air temperature.

4. The air conditioning system according to claim 1, wherein said control device restricts said port to be opened in response to changes in a target conditioned air temperature, when said detected water temperature reaches a first limit temperature.

5. The air conditioning system according to claim 4, wherein said control device restricts said port to be opened only to a face mode port, when said detected water temperature reaches a second limit temperature that is greater than said first limit temperature.

6. The air conditioning system according to claim 5, wherein said control device turns said compressor off when said detected water temperature reaches said second limit temperature.

7. The air conditioning system according to claim 1, wherein said vehicle is a work vehicle.

8. The air conditioning system according to claim 1, wherein said target conditioned air temperature is determined by calculations within said control device.

9. The air conditioning system according to claim 1, wherein said target conditioned air temperature is calculated based on a temperature set by a temperature setting device.

10. The air conditioning system according to claim 1, wherein said target conditioned air temperature is calculated based on a difference between an interior air temperature detected by an interior air temperature sensor and a temperature set by a temperature setting device.

11. The air conditioning system according to claim 1, wherein said target conditioned air temperature is calculated based on an exterior air temperature detected by an exterior air temperature sensor.

12. The air conditioning system according to claim 1, wherein said target conditioned air temperature is calculated based on an amount of sunshine detected by a sunshine sensor.

13. The air conditioning system according to claim 1, wherein said target conditioned air temperature is calculated based on a difference between an interior air temperature detected by an interior air temperature sensor and a temperature set by a temperature setting device, an exterior air temperature detected by an exterior air temperature sensor, and an amount of sunshine detected by a sunshine sensor.

14. The air conditioning system according to claim 1, wherein said control device selectively controls the opening of a plurality of ports through which said temperature controlled air flows into said interior of said vehicle in response to said water temperature that is detected by said water temperature sensor and said target conditioned air temperature.

15. The air conditioning system according to claim 1, wherein said port is a face mode port.

16. The air conditioning system according to claim 1, wherein said port is a foot mode port.

17. The air conditioning system according to claim 1, wherein said port is a vent mode port.

18. The air conditioning system according to claim 1, wherein said port is a defrost mode port.

* * * * *